(12) United States Patent
Bock et al.

(10) Patent No.: US 7,566,681 B2
(45) Date of Patent: Jul. 28, 2009

(54) PLATINUM BASED NANO-SIZE CATALYSTS

(75) Inventors: Christina Bock, Ottawa (CA); Chantal Paquet, Providence Bay (CA); Barry MacDougall, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 950 days.

(21) Appl. No.: 10/694,812

(22) Filed: Oct. 29, 2003

(65) Prior Publication Data

US 2004/0087441 A1 May 6, 2004

Related U.S. Application Data

(60) Provisional application No. 60/421,800, filed on Oct. 29, 2002.

(51) Int. Cl.
*B01J 23/42* (2006.01)
(52) U.S. Cl. .................. 502/339; 429/218.1; 429/218.2
(58) Field of Classification Search ................. 502/339; 429/218.1, 218.2
See application file for complete search history.

(56) References Cited

U.S. PATENT DOCUMENTS 6,146,782 A * 11/2000 Wendt et al. .................. 429/42
6,551,960 B1 * 4/2003 Laine et al. ................. 502/327

OTHER PUBLICATIONS

Jeffrey W. Long, et al, "How To Make Electrocatalysts More Active For Direct Methanol . . ." *J. Phys. Chem.* B 2000, 104, 9772-9776.
Xiaoming Ren, et al, "High Performance Direct Methanol Polymer Electrolyte Fuel Cells" *J. Electrochem. Soc.*, vol. 143, No. 1, Jan. 1996.
Helmut Bönnemann, et al "Formation of Colloidal Transition Metals in Organic Phases . . . " *Agnew. Chem. Int. Ed. Engl.* 30 (1991) No. 10.
L. Dubau, et al "Electrooxidation of Methanol at Platinum-Ruthenium Catalysts Prepared From Colloidal . . . " *Journal of Alpplied Electrochemistry* 33: 419-429, 2003.
M. C. Denis, et al, "High Energy Ball-milled Pt and Pt-Ru Catalysts for Polymer Elecxtrolyte . . . " *Journal of Applied Electrochemistry* 29: 951-960, 1999.
M. Watanabe, et al, "Electrocatalysis By AD-Atoms" *Electroanalytical Chemistry and Interfacial Electrochemistry*, 60 (1975) 267-273.
Yuan Wang, et al "Preparation of Tractable Platinum, Rhodium, and Ruthenium Nanoclusters With Small . . . " *Chem. Mater.* 2000, 12, 1622-1627.
H. Hoster, et al, "Current-Time Behavior of Smooth and Porous PrRu Surfaces for Methanol Oxidation" *Journal of The Electrochemical Society*, 148 (5) A496-A501 (2001).

\* cited by examiner

*Primary Examiner*—Stuart Hendrickson
(74) *Attorney, Agent, or Firm*—J. Wayne Anderson

(57) ABSTRACT

The synthesis of Pt and PtRu and other Pt based nano-particles that catalyze the electrochemical oxidation of methanol, carbon monoxide and hydrogen, as well as oxygen reduction, is described. The Pt based catalysts are synthesized in solution forming particles of 0.8 to 10 nm size (forming a "colloidal" solution) and are subsequently applied to a desired substrate as e.g., carbon black, graphite, metals. The application of the nano-sized catalyst particles on the substrates involves electroless deposition at open-circuit, such as immersing the substrate into the colloidal solution or spraying the catalyst particles on the substrate. The Pt, PtRu and other Pt based catalyst can also be directly deposited on the substrate involving the simultaneous reduction and deposition of the Pt based catalysts onto the substrate surface and into its porous structure. The presently described synthesis and deposition of the resulting Pt based nano-particles on and into a variety of high surface area and preferably electronically conductive substrates results in electrodes of high surface areas, relates directly to the preparation and use of high surface area electrodes, (anodes and cathodes) which could be used in e.g., direct methanol, hydrogen and hydrogen containing carbon monoxide fuel cells.

9 Claims, 10 Drawing Sheets

PLATINUM BASED NANO-SIZE CATALYSTS

This application claims priority from U.S. Patent Application 60/421,800 filed Oct. 29, 2002.

BACKGROUND OF THE INVENTION

1. Field of the Invention

This invention relates to Pt based nano-size particles for use in fuel cells and the like, distributed within/on high surface area, preferably electronically conductive support materials and to the making of electrodes therefrom. This invention also involves the synthesis of Pt based fuel cell (FC) catalysts in the nano-size range that are electro-catalysts for methanol, hydrogen, carbon monoxide oxidation and oxygen reduction. This invention also relates to the deposition of the fuel cell catalysts on desired supports that are preferably electronically conductive and of high surface area, as well as on/into substrates of complex structure and high internal surface area.

2. Description of the Prior Art

Direct methanol and polymer electrolyte membrane fuel cells (referred to as DMFCs and PEMFCs, respectively) preferably operate using catalysts containing Pt and in some cases one or more ad-metal and/or ad-metal oxides[1]. Particularly due to the high price of noble metals a good catalytic performance employing low noble metal catalysts loadings is desired. The state of the art technology involves the preparation of dispersed noble catalysts onto carbon blacks that are subsequently dispersed using suitable chemicals/solutions forming a so called "ink" that is then applied and pressed onto the FC membrane[2].

Much information regarding the preparation of FC catalysts is proprietary. Reported synthesis methods of these noble metal catalysts often involve the reduction of noble metal salts using chemical reduction methods or reduction of them at high temperatures. Previous catalyst preparation methods involved the synthesis of Pt and PtRu, etc., colloids in the 2, 3-4 and larger than 5 nm range[3]. The synthesis methods often involve multiple steps and organic solvents such as e.g., tetrahydro furan (THF) that are volatile, toxic and in the case of THF form unstable, and violently reacting peroxides. Often complex and large organic compounds (called a stabilizer) are used to stabilize the noble metal colloids in solution through, normally chemically, and hence, strong interactions between the stabilizer and the catalyst particles. Subsequently the catalysts are applied onto the support, which is typically carbon black. The stabilizers are suggested to be removable from the noble metal catalysts by heat treatment (i.e., temperatures>200° C.)[4]. In some cases, the stabilizer also acts as the reducing agent for the noble metal salts or a chemical reducing agent such as sodium borohydride is employed.

Other catalyst synthesis methods involve high temperature (typically 400-600° C.) methods and $H_2$ or synthesis gas ($H_2/N_2$ mixture) as reducing agent. Lengthy and energy-consuming ball-mill processes for the preparation of FC catalysts have also been tested[5]. Many of these synthesis methods are lengthy, time-consuming processes that involve toxic reactants and/or solvents that are hazardous. Furthermore, high temperatures are often involved in the synthesis of these catalysts that is likely to result in sintered, agglomerated and dehydrated forms of the catalysts. Sintering and agglomeration processes result in larger particles, thus decreasing the electro-active catalyst area per weight of the catalyst. Furthermore, dehydrated forms of the Pt based noble metal catalysts such as PtRu are less desirable than the hydrated forms, particularly for direct methanol fuel cell applications.

Also, the synthesis of single metal particles from colloidal solutions including ethyleneglycol has been described[7]. Wang et al.[7] used water to adjust their particle size. We do not use water; in fact, the use of excessive amounts of water to make bi-metallic PtRu catalysts is likely not desirable, as it is expected to result in the formation of complicated Ru-aqueo and oxy complexes. Also, we tried to repeat their suggestion and use water to adjust the Pt particle size, however, we were not successful. Also, they state that the noble metal salts are reduced by argon, which is simply not possible.

SUMMARY OF THE INVENTION

According to the invention, a rapid, "economic" and simple synthesis route for Pt based e.g. PtRu nano-particle catalysts is provided. Changes in the synthesis parameters (in particular the pH of the synthesis solution) allow for the selection of catalyst particle size, size distribution and interactions/ratio between stabilizer and particle.

According to one aspect of the invention Pt based e.g. PtRu particles of desired sizes between 0.8 to 10 nm are synthesized in ethylene glycol solutions (i.e., forming a colloidal solution) and the catalyst particles are applied to a desired support by immersing the support in the preferably stirred colloidal solution or by spraying the nano-particles particles on/into the support. The supports are preferably electronically conductive and are of preferably high surface area. The pH of the ethylene glycol solution is adjusted to basic using different amounts of for example a strong base such as sodium hydroxide, thus resulting in the desired, final catalyst particle size range.

In another aspect of the invention, Pt based e.g. PtRu catalyst nano-particles in the particle size range of 1 to 5 nm, are provided.

The Pt based e.g. PtRu catalyst nano-particles are directly applied to the support by reducing precursor metal salts and depositing the catalysts onto the support during the synthesis.

The support is typically a high surface area, porous material that is preferably an electronic conductor and the Pt based catalyst particles are deposited on and/or into the porous structure of the support.

Ethylene glycol acts as a solvent and as a reducing agent. The oxidation products of ethylene glycol namely, glycolic acid, oxalic acid and adsorbed carbon monoxide act as particle stabilizers in solution.

Any residual ethylene glycol reaction products retained by the catalyst particles are easily removed from the particles surface by electrochemical oxidation and/or by heating in air at elevated temperatures, preferably below 200° C. to avoid modification of the catalyst particles.

In one embodiment of the invention we provide, PtRu alloy nano-particles of 2.5±0.5 nm size and atomic Pt:Ru ratio of 50:50%, that are supported on and/or into preferably electronically conductive and preferably high surface area supports.

In a related embodiment, nano-particles of particle size in the range of 2.5±0.5 nm and Pt:Ru atomic percentage ratio of 50:50% are provided, consisting essentially of a PtRu alloy phase of 85:15 Pt:Ru atomic percentage ratio, a Pt phase and a Ru phase.

In a further related embodiment, nano-particles of desired particle size in the range of 1 to 5 nm and Pt:Ru of 50:50% atomic percentage ratio are provided, consisting essentially of a PtRu alloy phase of 85:15 Pt:Ru atomic percentage ratio, a Pt phase and a Ru phase.

In another embodiment of the invention we provide, PtRu alloy nano-particles of 1.5±0.5 nm size and atomic Pt:Ru ratio of 70:30% that are supported on and/or into preferably electronically conductive and preferably high surface area supports.

In a related embodiment of the invention, PtRu alloy nano-particles of 1.5±0.5 nm size and atomic Pt:Ru ratio of 70:30%, are provided consisting essentially of a PtRu alloy phase of 85:15 Pt:Ru atomic percentage ratio, a Pt phase and a Ru phase.

In a further related embodiment, nano-particles of desired particle size in the range of 1 to 5 nm and Pt:Ru atomic percentage ratio of 70:30% are provided, consisting essentially of a PtRu alloy phase of 85:15 Pt:Ru atomic percentage ratio, a Pt phase and a Ru phase.

According to another aspect of the invention, the Pt based e.g. PtRu nano-particle catalysts deposited on and/or into the support (therefore, called supported catalysts) are formed into an electrode and used as electro-catalysts for the oxidation of hydrogen, carbon monoxide or methanol.

The supported Pt based e.g. PtRu catalysts are formed into an electrode and are also used as electro-catalysts for the reduction of oxygen.

The Ru may be replaced with Re, Ir, Os, Sn, Sb, Au, $WO_x$, $MoO_x$ or a mixture thereof.

The Pt based catalysts can contain multiple ad-metals (additional metals) and ad-metal oxides of different atomic ratios such as Ru, Re, Ir, Os, Sn, Sb, Au, $WO_x$ and $MoO_x$.

The present invention is also directed towards the making of anodes and cathodes for the application in fuel cells.

According to one aspect of the invention, platinum based metal catalyst nano-particles of structural formula PtX, where X is an ad-metal or an ad-metal oxide selected from the group consisting of Ru, Re, Ir, Os, Sn, Sb, Au, $WO_x$, $MoO_x$ and a mixture thereof of controlled particle size in the nano-size range of 0.8 to 10 nm and of selected atomic Pt:X percentage ratios, are provided.

The nano-particles can be applied or directly synthesized onto/into suitable support materials resulting in supported catalysts.

According to an embodiment of this invention, the catalyst particles are in the nano-size range of 1 to 5 nm.

According to another embodiment of this aspect of the invention, X is Ru and the Pt:Ru atomic % ratio is in the range of 50:50 to 80:20.

According to another embodiment of this aspect of the invention, X is Ru, the Pt:Ru atomic % ratio is 50:50 and the particle size is 2.5±0.5 nm.

According to yet another embodiment of this aspect of the invention, X is Ru, the Pt:Ru atomic % ratio is 50:50, the particle size is 2.5±0.5 nm, and consisting essentially of a PtRu alloy phase of 85:15 Pt:Ru atomic percentage ratio, a Pt phase and a Ru phase.

According to another embodiment of this aspect of the invention, X is Ru, the Pt:Ru atomic % ratio is 70:30 and the particle size is 1.5±0.5 nm.

According to yet another embodiment of this aspect of the invention, X is Ru, the Pt:Ru atomic % ratio is 70:30, the particle size is 1.5±0.5 nm, and consisting essentially of a PtRu alloy phase of 85:15 Pt:Ru atomic percentage ratio, a Pt and a Ru phase.

These supported catalysts are subsequently formed into electrodes to be used as anode or cathode in fuels cells for $H_2$, CO, $CH_3OH$ oxidation reaction and $O_2$ reduction reactions, respectively.

The involvement between the nano-particle and the stabilizer, can be minimized, as the residual reaction products of the stabilizer ie. glycolic acid, oxalic acid, and absorbed carbon monoxide can be easily removed by oxidation to $CO_2$ electrochemically and/or at elevated temperatures (preferably below 200° C.) in an oxidizing atmosphere. This results in higher electro-catalytic activities.

The support is preferably an electronic conductor of preferably high surface area and the Pt based catalysts can be deposited or directly synthesized on the support and/or into the internal porous structure of the support. The substrate can be in the form of a metal, metal oxide, carbon based materials such as carbon blacks, graphite, gas diffusion electrodes or electronically so called conductive ceramics.

According to another aspect of the present invention, a process is provided for making platinum based metal catalyst nano-particles of structural formula PtX, where X is an ad-metal or an ad-metal oxide selected from the group consisting of Ru, Re, Ir, Os, Sn, Sb, Au, $WO_x$, $MoO_x$ and a mixture thereof of controlled particle size in the nano-size range of 1 to 5 nm and of selected atomic Pt:X percentage ratios, comprising (a) providing metal precursors, such as metal ions, ad-metal ions and ad-metal oxide ions in the form of salts, e.g., Pt-chlorides (such as $H_2PtCl_6$) and the salts of the desired ad-metals/ad-metal oxides, (b) adding the metal precursors to a pH adjusted to basic, e.g., by a strong base such as NaOH, solution of ethylene glycol which is used simultaneously as solvent, reducing agent and catalyst particle stabilizer, to form a colloidal solution, (c) reacting to provide a reduction reaction of the metal precursors and formation of the Pt based catalyst nano-particles e.g. at temperatures higher than 140° C. for a few minutes up to 3 hours, or by slowly raising the temperature over periods of several hours.

Optionally additionally comprising, the further step of (d) simultaneously forming and depositing the catalyst nano-particles by adding a support to the synthesis colloidal solution (that comprises the metal salts and ethylene glycol, according to steps (a) and (b), or by immersing (impregnating) the support in the synthesis colloidal solution before the reduction/deposition process takes place according to step (c), or alternatively additionally comprising the further step of (d')

(d') synthesizing the Pt based nano-size catalyst particles in ethylene glycol according to steps (a) to (c) and subsequently applying the particles on/into the support by immersing the support in the preferably stirred colloidal solution or by spraying the nano-sized catalyst particles on/into the support.

Preferably, a further step is included ie. of removing any residual ethylene glycol stabilizer reaction products from the particles' surface. Specifically, we have found that ethylene glycol is oxidized via two pathways forming glycolic and oxalic acid in the synthesis solution as well as CO adsorbed on the catalyst surface. Glycolic and/or oxalic acid may also adsorb on the catalyst surface. The adsorbed CO, glycolic and oxalic acids are removed by either electrochemical or oxidation at elevated temperatures below 200° C.

In a related embodiment of this aspect of the invention, in step (b), the pH of the solution is initially controlled in a range of ca. 12 to 8. The pH of the solution drops during the synthesis as a result of the oxidation of ethylene glycol to various organic species and protons.

BRIEF DESCRIPTION OF THE DRAWING

FIG. 5 shows TEM images of PtRu particles of 50:50 Pt:Ru at. % composition supported on carbon black. The PtRu particle size was adjusted with the addition of NaOH to the ethylene glycol solution, as described in the caption for FIG. 4 and Table 1. FIG. 5b shows the same for 2±0.5 nm particles, while FIG. 5a shows a magnification of 460'000, while FIGS. 5b and c show a magnification of 390'000.

FIG. 6 shows zoomed scans between 20 and 60° using a step size of 0.06° and 60 s acquisition time for different PtRu particle sizes as follows: a) 2.5±0.5 nm and b) 2±0.5 nm. The software program Topas 2 (DIFFRAC$^{PLUS}$ Topas, Bruker axs, Inc.) was employed to extract lattice parameter constants from the experimental XRD spectra. The entire spectra recorded between 20 and 75° were used for the fitting considering also micro-strain. Lattice parameters for the face centered cubic (fcc) Pt of 0.39059±0.0015 nm were obtained for the face centered cubic lattice of Pt independent of the PtRu particle size. This indicates that the PtRu particles consist of a PtRu alloy phase of 85:15 (±8) Pt:Ru at. % composition.

FIG. 7 shows zoomed scans between 22 and 60° using a step size of 0.06° and 60 s acquisition time. The software program Topas 2 (DIFFRAC$^{PLUS}$ Topas, Bruker axs, Inc.) was employed to extract lattice parameter constants from the experimental XRD spectra. The entire spectra recorded between 20 and 80° were used for the fitting considering also micro-strain. Lattice parametes for fcc Pt of 0.390302±0.001 nm were obtained for the face centered cubic lattice of Pt independent of the PtRu particle size. This indicates that the PtRu particles consist of a PtRu alloy phase of 85:15 (±8) Pt:Ru at. % composition.

DETAILED DESCRIPTION OF THE INVENTION

Figure 1:
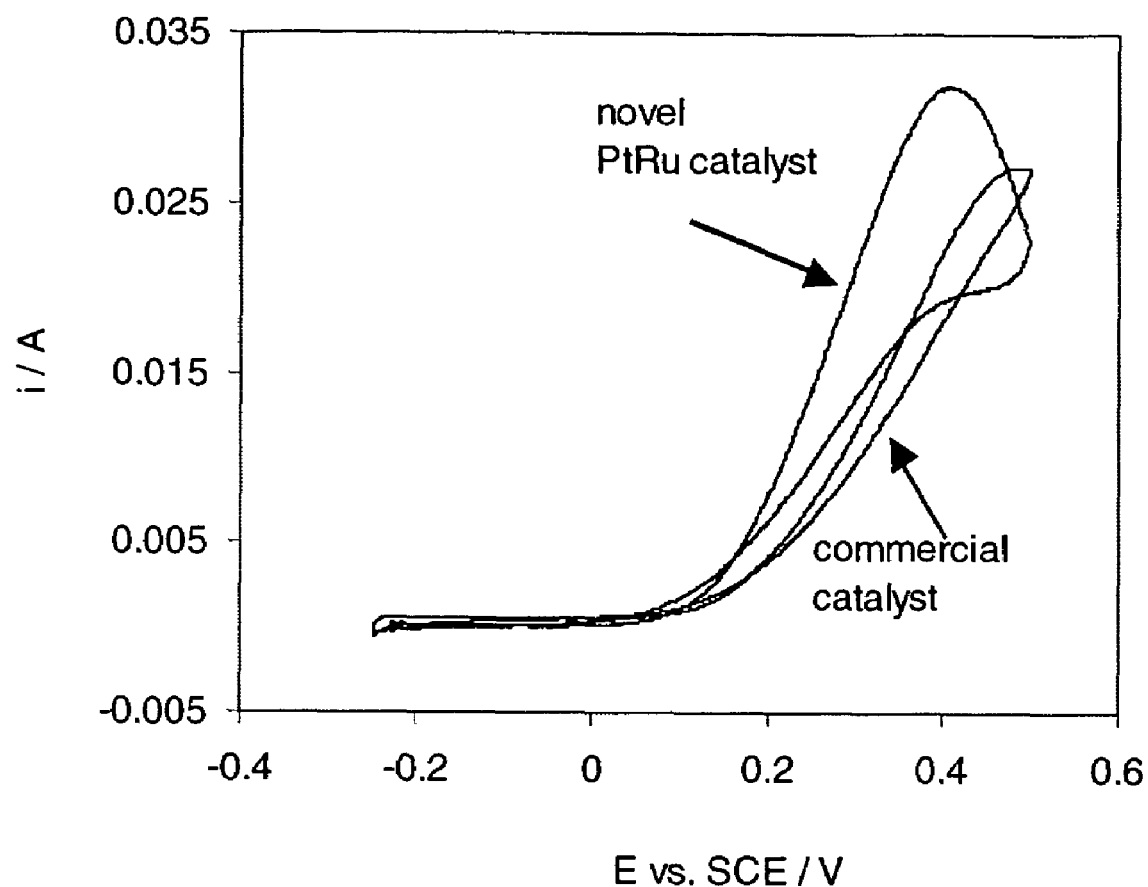
FIG. 1 illustrates cyclic voltamograms recorded at 10 mV $s^{-1}$ for a 2.5±0.5 nm PtRu (50:50 at % Pt:Ru) anode catalyst supported on carbon black (Vulcan XC-72-R, Cabot) in 0.5 M $CH_3OH$ and 0.5 M $H_2SO_4$ at 60° C. (referred to as novel PtRu catalyst). The PtRu loading is 20 w % Pt and 10 w % Ru on the carbon black. A CV for a commercial (Johnson&Matthey) PtRu catalyst of 20 w % Pt and 10 w % Ru loading on carbon black is also shown in the figure. The same conditions are used to record the CVs for the two catalysts. A thin electrode layer using a gold substrate electrode was used for the CV measurements. The Pt loading was 15 µg for both catalyst powders.
Figure 2:
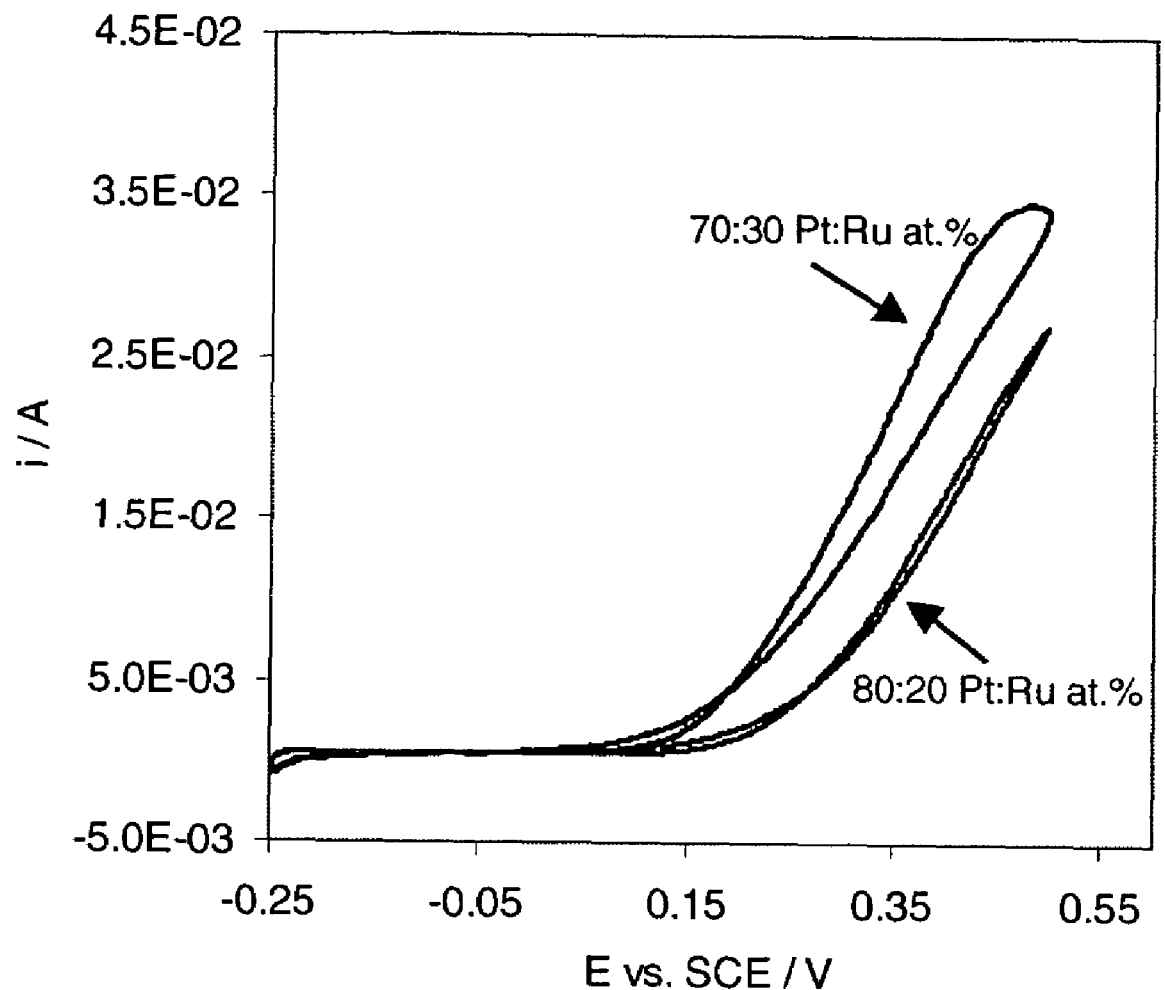
FIG. 2 illustrates the $CH_3OH$ oxidation activities seen in cyclic voltamogram characteristics recorded at 10 mV $s^{-1}$ for a PtRu catalysts of 70:30 and 80:20 Pt:Ru at % composition supported on carbon black (Vulcan XC-72-R, Cabot) in 0.5 M $CH_3OH$ and 0.5 M $H_2SO_4$ at 60° C. The PtRu particle sizes are: a) 70:30 at. Pt:Ru %: 1.5±0.5 nm and b) 80:20 at. Pt:Ru %: 1.2±0.5 nm. A thin electrode layer using a gold substrate electrode was used for the CV measurements.
Figure 3A:
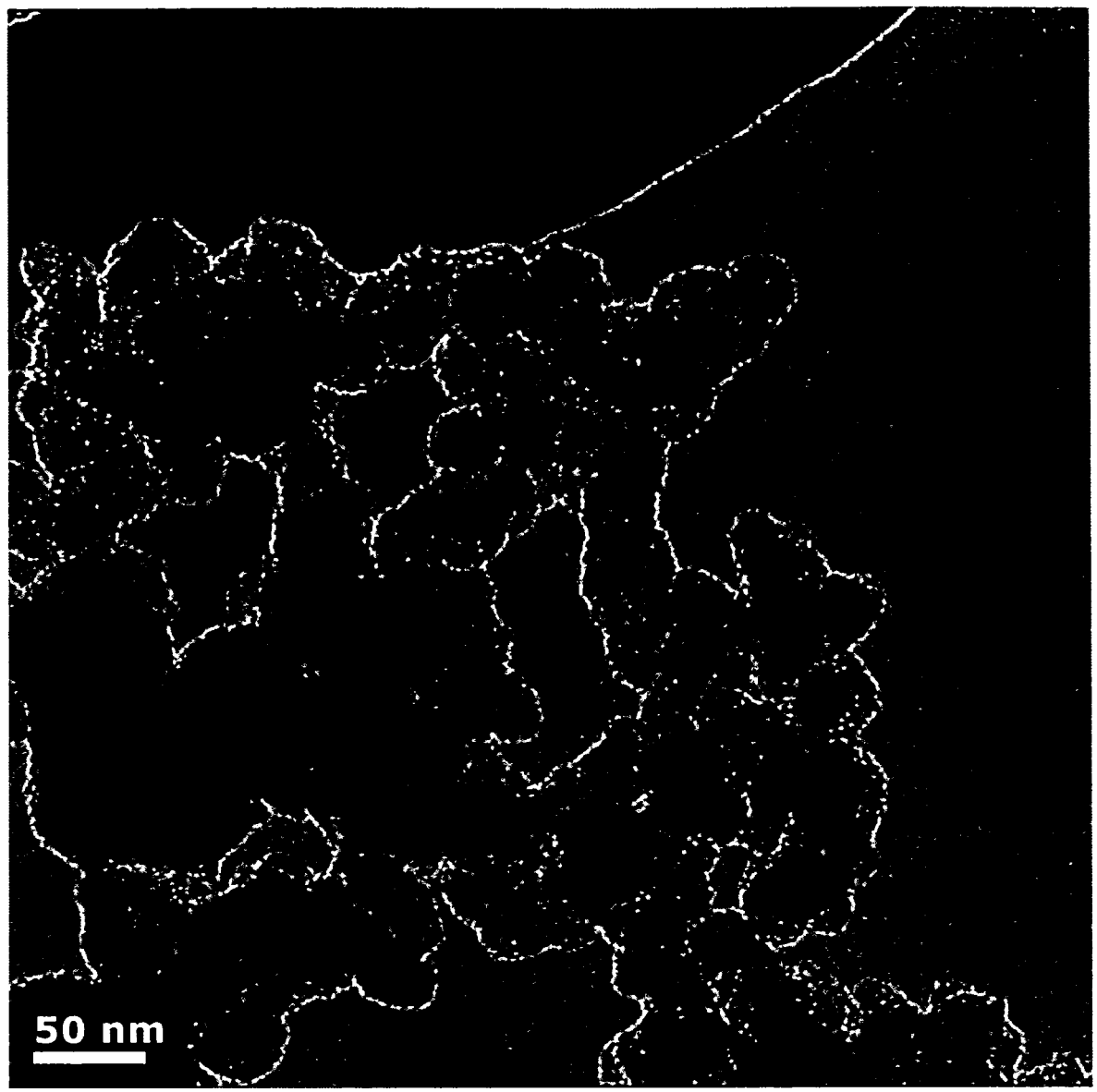
FIG. 3a shows a magnification of 422'000, while FIGS. 3b and c show a magnification of 880'000.
Figure 3B:
FIG. 3 shows TEM images of PtRu particles of 50:50 Pt:Ru at. % (FIG. 3a) and 70:30 at. % (FIG. 3b) composition supported on carbon black. The particle size of the 50:50 Pt:Ru at. % catalyst is 2.5±0.5 nm and 1.5±0.5 nm for the 70:30 at. % Pt:Ru catalyst. The PtRu particles were synthesized using $H_2PtCl_6$ and $RuCl_3$ precursor salt in ethylene glycol solutions. The pH of the ethylene glycol solution was adjusted using NaOH as similarly described in the caption for Table 1. The lighter grey areas show the carbon particles, while the dark, black areas represent the PtRu catalyst particles.
Figure 4:
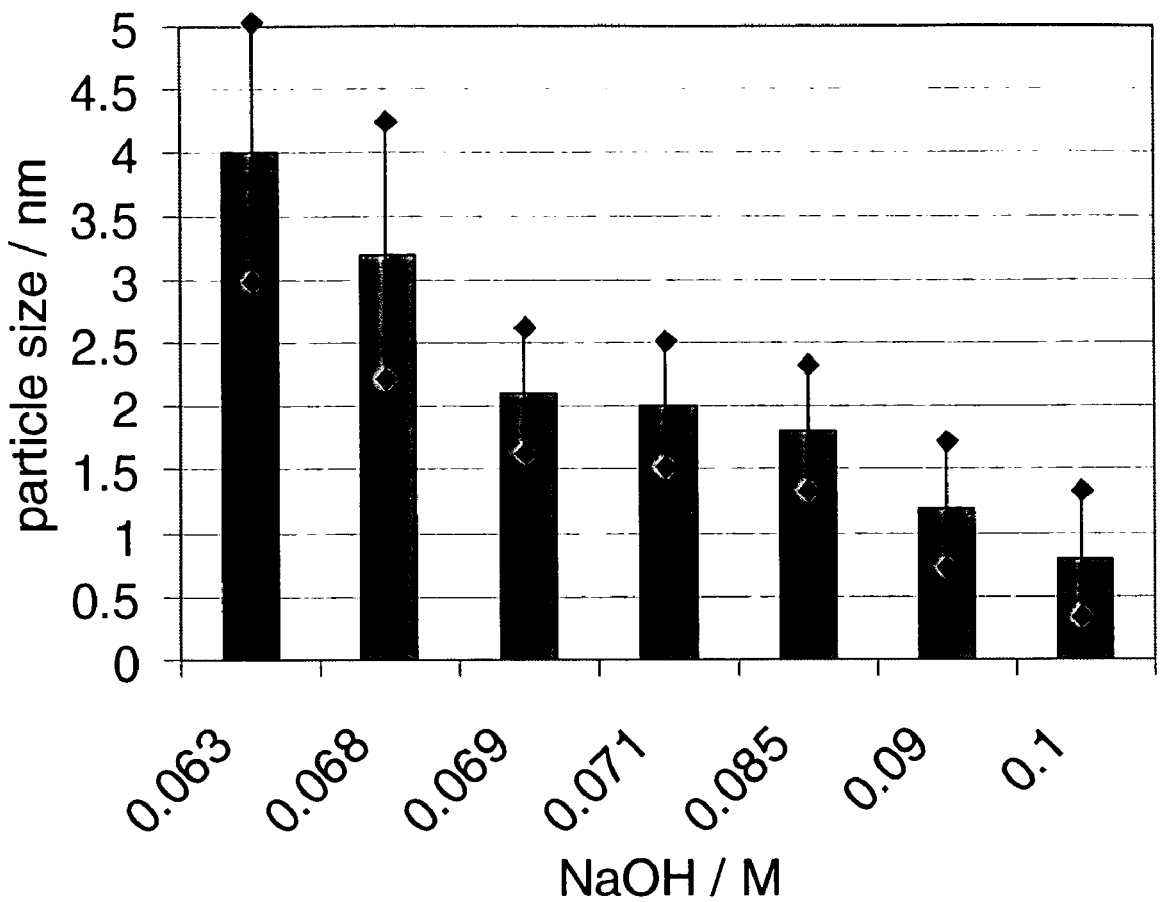
FIG. 4 illustrates the influence of the NaOH concentration in the ethylene glycol solution on the resulting PtRu particle size for the case of PtRu particles of 50:50 Pt:Ru at. % composition. The synthesis solutions were made of $1.4 \times 10^{-2}$ M $PtCl_4$, $1.3 \times 10^{-2}$ M $RuCl_3$ and a particular NaOH concentration, as indicated in FIG. 4. Particle size measurements were obtained from transmission electron (TEM) images of PtRu particles supported on carbon black counting more than 100 particles in each particular case. The vertical bars indicate the particle size distribution.
Figure 5A:
FIG. 5a shows PtRu particles of 1.2±0.5 nm.
Figure 5B:
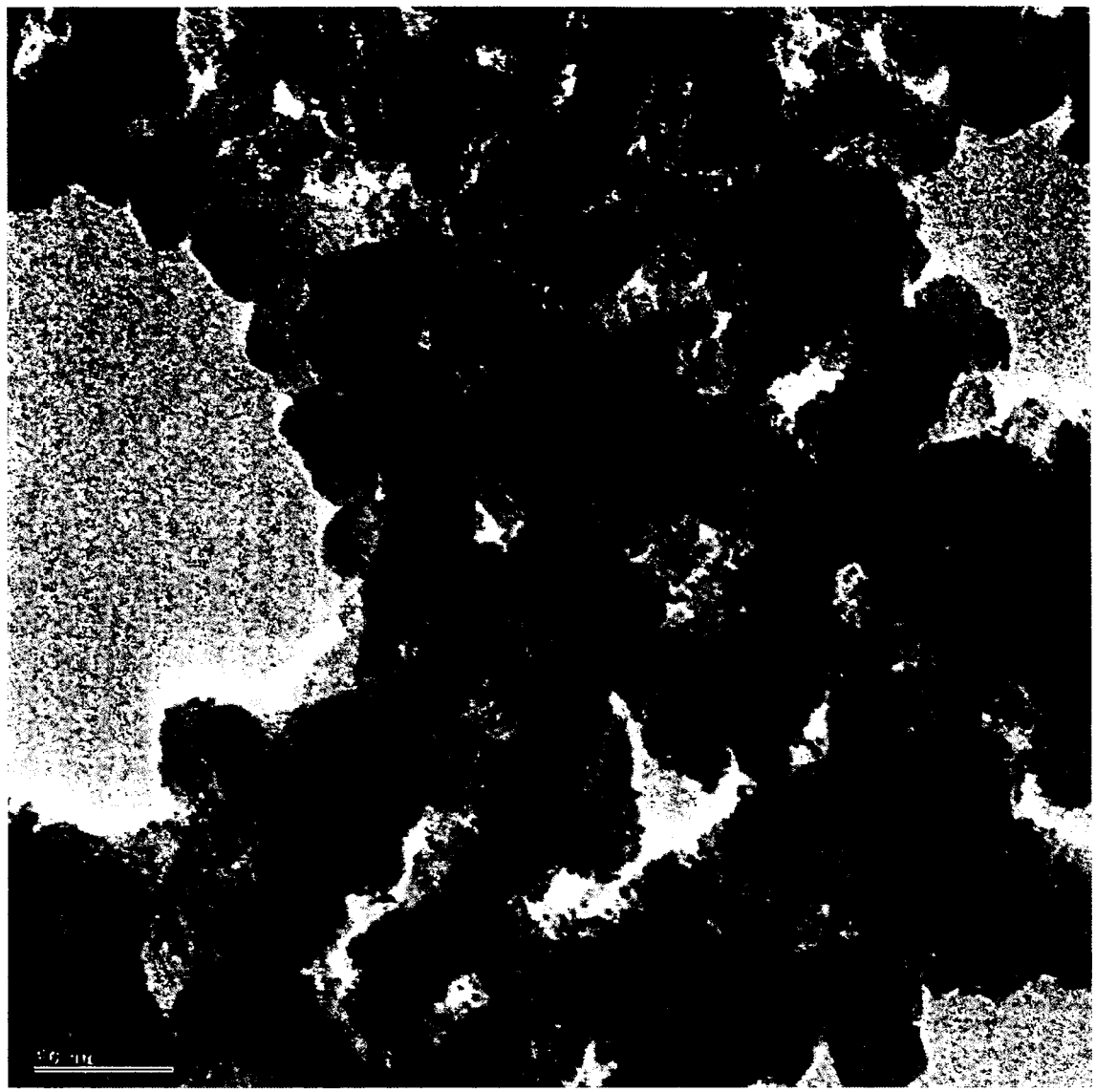
Figure 5C:
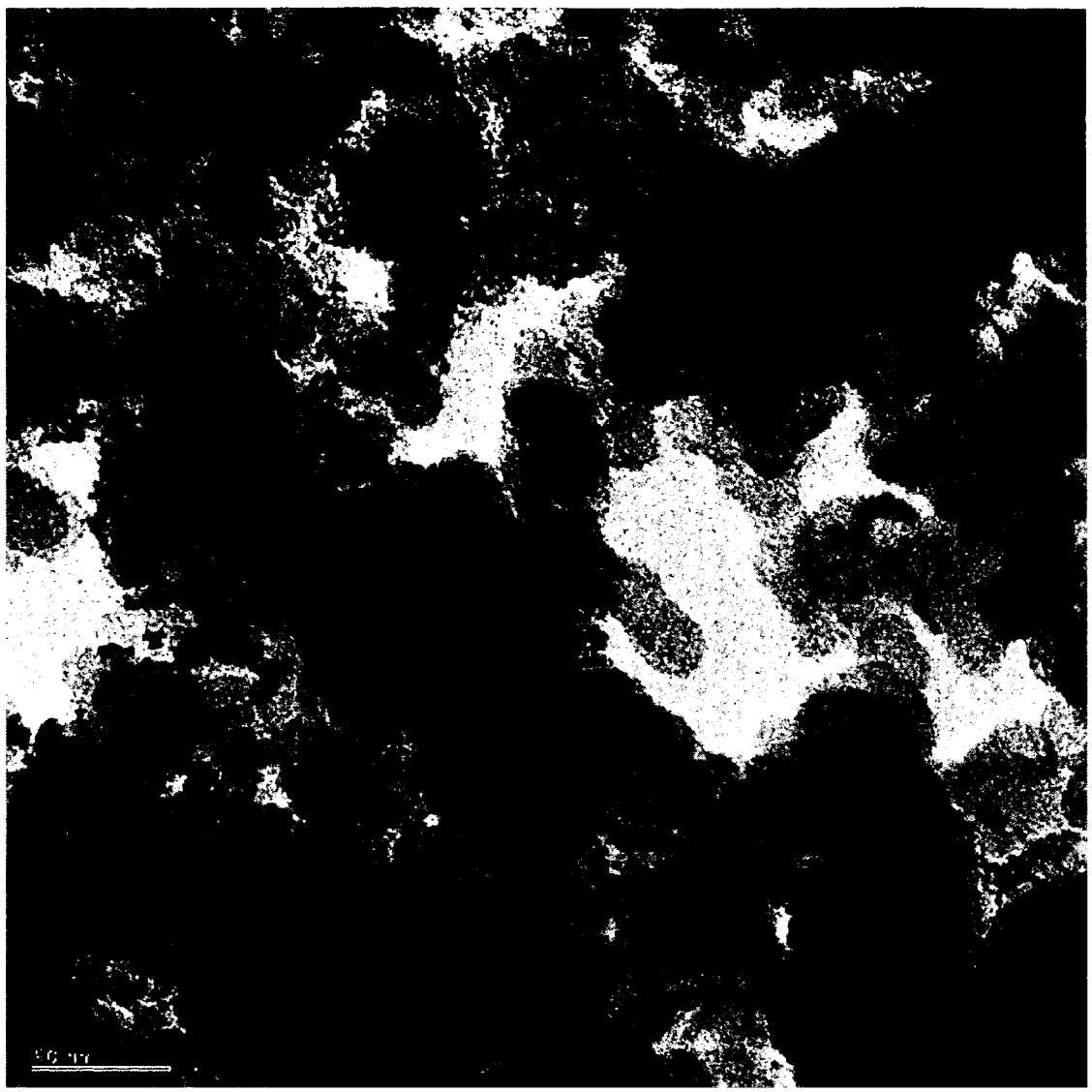
FIG. 5c shows the case of 3±1 nm particles. The lighter grey areas show the carbon particles, while the dark, black areas represent the PtRu catalyst particles.
Figure 6:
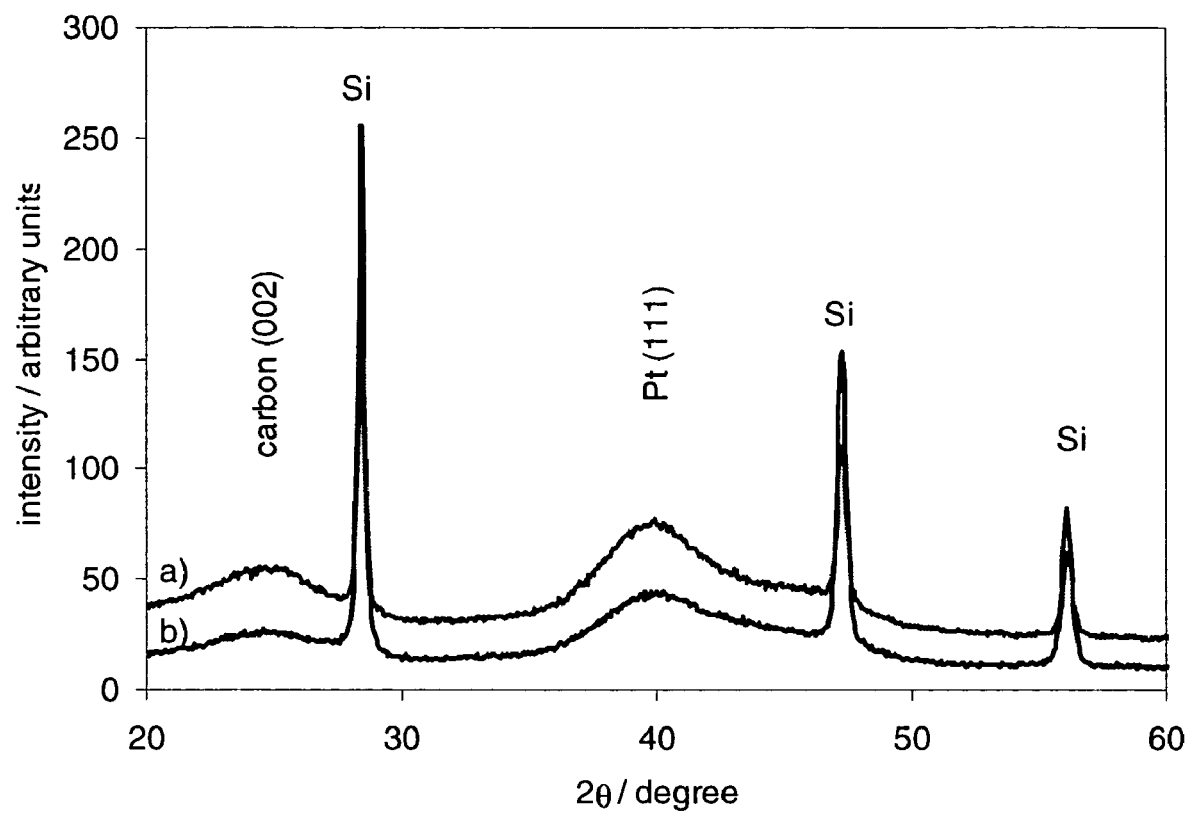
FIG. 6 shows XRD spectra for PtRu catalysts supported on carbon black consisting of a Pt:Ru composition of 50:50 at. %. Si powder was added as internal standard to the as prepared catalyst powders.
Figure 7:
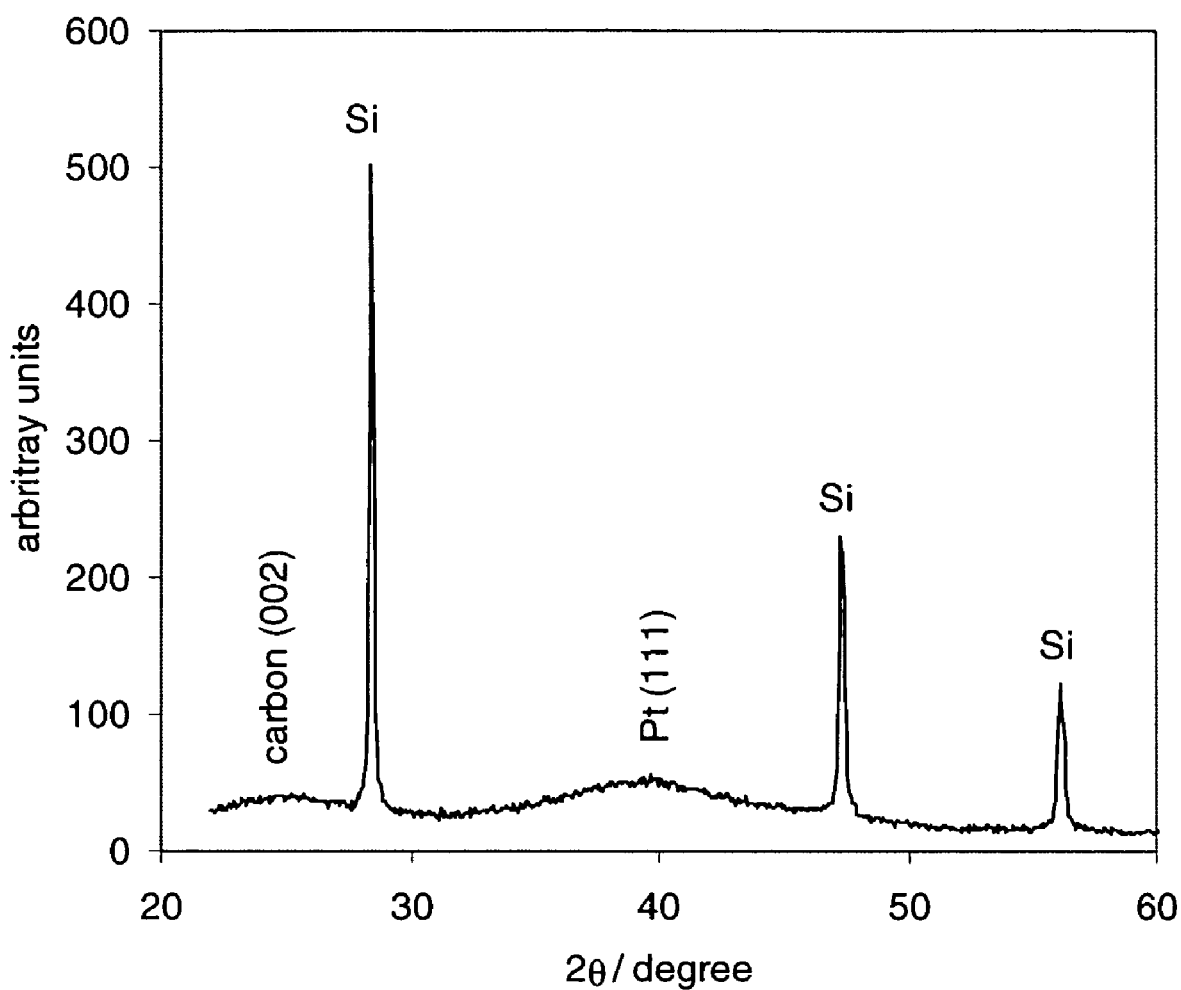
FIG. 7 shows a XRD scans of PtRu particles supported on carbon black. The PtRu particles consist of a 70:30 at. % composition of Pt:Ru and a particle size of 1.5±0.5 nm. Si powder was added as internal standard to the as prepared catalyst powders.

According to the process of the invention, high surface area Pt based catalysts are synthesized that exhibit beneficial catalytic activities towards the oxidation of $H_2$, $CH_3OH$ and CO as well as the reduction of $O_2$. Pt based catalysts that contain suitable ad-metals and/or ad-metal oxides such as bimetallic PtRu catalysts exhibit a catalytic advantage for the electrochemical $CH_3OH$ and CO oxidation reaction as compared to Pt only. The catalytic advantage is believed to be due to a so called bi-functional mechanism[6] and is seen in lower $CH_3OH$ and CO oxidation potentials and higher activity for the oxidation reaction, particularly at low potentials and a lower degree of catalyst poisoning than observed in[6] for Pt only. As seen in the figure, using the process described here, PtRu catalysts can be directly synthesized and/or subsequently supported onto carbon blacks (acetylene black or Vulcan XC-72R) that show higher activities per weight Platinum for the electrochemical $CH_3OH$ oxidation reaction than commercially available PtRu catalysts (Johnson&Matthew, E-Tek) tested under comparable conditions. (Higher activity is believed to be due an optimization of the PtRu particle size/distribution, minimized catalyst and stabilizer interactions as well as improved contact (adhesion) between the catalyst particles and the carbon support. The atomic ratio of Pt vs. the ad-metal and/or ad-metal oxides can be adjusted by using the corresponding amount of the precursor metal salts in the synthesis solution.

The reaction mechanism likely involves the decomposition of Pt-chloride at higher T>135° C. and reduction of the metal salts in the reducing, ethylene glycol environment.

The Pt based catalysts can be synthesized directly or subsequently supported on a suitable substrate (i.e., resulting in a catalyst loaded substrate). The catalyst loaded substrates can be washed with water (to remove excess ethylene glycol) and dried at temperatures preferably below 110° C., since higher oxidation activities at low potentials are achieved by drying the catalysts at such temperatures, although temperatures below 200° C. will also work, as the catalyst deactivation between 110 and 200° C. is minor, i.e., not a strong function of the temperature. The catalyst deactivation induced at higher temperatures is due to phase separation, and hence, non-ideal Pt:Ru distribution on the atomic scale as well as an increase in particle size [2].

The catalyst loaded substrates can be formed and/or directly used as an electrode for the electrochemical $CH_3OH$, $H_2$, CO oxidation reaction or the $O_2$ reduction reaction. In the case of catalysts loaded onto carbon blacks an ink can be formed and applied on e.g., the FC membrane, as described elsewhere.

TABLE 1

Influence of the NaOH concentration of the ethylene glycol synthesis solution on the resulting PtRu particle size

| $c_{NaOH}$/mol l$^{-1}$ | PtRu particle size/nm |
|---|---|
| 0.09 | 1.2 ± 0.5 |
| 0.085 | 1.8 ± 0.8 |
| 0.071 | 2 ± 0.5 |
| 0.069 | 2.1 ± 0.5 |
| 0.068 | 3.2 ± 1 |
| 0.063 | 4 ± 1 |

Table 1 illustrates the influence of the NaOH concentration in the ethylene glycol solution on the resulting PtRu particle size for the case of 50:50 Pt:Ru at. % particles. The synthesis solutions were made of $1.4 \times 10^{-2}$ M PtCl$_4$, $1.3 \times 10^{-2}$ M RuCl$_3$ and a particular NaOH concentration, as indicated in Table 1. Particle size measurements were obtained from transmission electron (TEM) images of PtRu particles supported on carbon black counting more than 100 particles for a particular catalyst system.

The activity of these Pt noble metal catalysts can be activated for the electrochemical CH$_3$OH oxidation reaction and possibly also other reactions using electrochemical methods. Two methods of possible activation have been determined, of which, one is irreversible and the other is referred to as reversible activation, as follows:

(a) irreversible catalyst activation is carried out by subjecting the supported catalyst to continuous oxidation/reduction cycles in CH$_3$OH solutions. The CH$_3$OH oxidation activity steadily increases by continuous potential cycling. After ca. ten complete oxidation/reduction cycles to a sufficiently positive potential limit a steady-state, (b) a second reversible catalyst activation involves "reductive" electrochemical treatment. The CH$_3$OH oxidation activity can be enhanced by potential cycling or potential pulsing to negative potential values for short period of times (few seconds are sufficient). This activation is believed to remove carbonaceous poisoning species from the catalyst surface.

In both cases, higher activities for the CH$_3$OH oxidation reaction are achieved. Both activation processes are commonly known in the literature and apply in general to Pt based catalysts used for e.g., the CH$_3$OH oxidation reaction[8].

REFERENCES

1. J. O'M. Bockris and H. Wroblowa, *J. Electroanal. Chem.*, 7, 428 (1964) J. W. Long, R. M. Stroud, K. E. Swider-Lyons and D. R. Rolison, *J. Phys. Chem. B*, 104, 9772 (2000)
2. X. Ren, M. S. Wilson, S. Gottesfeld, *J. of the Electrochemical Society*, 143, L12 (1996)
3. H. Boennemann, W. Brijoux, R. Brinkmann, E. Dinjus, T. Joussen and B. Korall, *Angew. Chem. Int. Engl.*, 30, 1312 (1991)
4. L. Dubau, C. Coutanceau, E. Garnier, J-M. Leger, C. Lamy, *J. Appl. Electrochem.*, 33, 419 (2003)
5. M. C. Denis, G. Lalande, D. Guay, J. P. Dodelet, R. Schulz, *J. Appl. Electrochem.*, 29, 915 (1999)
6. M. Watanabe and S. Motoo, *J. Electroanal. Chem.*, 60, 267 (1975)
7. Y. Wang, J. Ren, K. Deng, L. Gui, Y. Tang, *Chem. Mater.*, 12, 1622 (2000)
8. H. Hoster, T. Iwasita, H. Baumgartner, W. Vielstich, *J. of the Electrochemical Society*, 148, A496 (2001)

The invention claimed is:

1. Platinum based metal catalyst nano-particles of composition PtX, where X is Ru, of controlled particle size in the nano-size range of 0.8 to 10 nm and of selected atomic Pt:X percentage ratios in the range of 70:30 to 80:20, including a Pt/Ru alloy phase of 85:15 Pt:Ru atomic percentage ratio.

2. The catalyst nano-particles according to claim 1, and consisting essentially of a PtRu alloy phase of 85:15 Pt:Ru atomic percentage ratio, a Pt phase and a Ru phase.

3. The catalyst nano-particles according to claim 1, wherein the Pt:Ru atomic % ratio is 70:30 and the particle size is 1.5±0.5 nm.

4. The catalyst nano-particles according to claim 1, wherein the Pt:Ru atomic % ratio is 70:30, the particle size is 1.5±0.5 nm, and consisting essentially of a PtRu alloy phase of 85:15 Pt:Ru atomic percentage ratio, a Pt phase and a Ru phase.

5. The catalyst nano-particles according to claim 1, wherein the catalyst particles are in the nano-size range of 1 to 5 nm.

6. The catalyst nano-particles according to claim 1, deposited on or directly synthesized onto or into the internal porous structure of a support material, resulting in supported catalysts.

7. The catalyst nano-particles according to claim 6, wherein the support is an electronic conductor of high surface area in the form of a metal, metal oxide, carbon based materials, gas diffusion electrodes or electronically conductive ceramics.

8. The catalyst nano-particles according to claim 6, wherein the supported catalysts are in the form of electrodes to be used as anode or cathode in fuel cells for H$_2$, CO, CH$_3$OH oxidation reaction and O$_2$ reduction reactions, respectively.

9. The catalyst nano-particles according to claim 1, wherein the Pt:Ru atomic % ratio is 80:20 and the particle size is 1.2±0.5 nm, and consisting essentially of a PtRu alloy phase of 85:15 Pt:Ru atomic percentage ratio, a Pt phase and a Ru phase.

* * * * *